(12) United States Patent
Farah

(10) Patent No.: US 7,916,846 B1
(45) Date of Patent: Mar. 29, 2011

(54) SYSTEM AND METHOD FOR IDENTIFYING AND TREATING CALLS

(75) Inventor: Jeffrey Farah, North Brunswick, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1126 days.

(21) Appl. No.: 11/218,062

(22) Filed: Aug. 31, 2005

(51) Int. Cl.
*H04M 3/42* (2006.01)

(52) U.S. Cl. ......... 379/201.02; 379/207.02; 379/218.01; 379/133; 379/88.22

(58) Field of Classification Search ............... 379/88.22, 379/201.02, 67.1, 100.01, 188, 192, 199, 379/200, 196, 197, 198, 201, 207, 189, 207.02, 379/218.01, 133
See application file for complete search history.

(56) References Cited

U.S. PATENT DOCUMENTS

| 5,802,157 | A | | 9/1998 | Clarke et al. |
| 6,134,310 | A | * | 10/2000 | Swan et al. .................... 379/188 |
| 6,888,820 | B1 | | 5/2005 | Howell |
| 2002/0172333 | A1 | * | 11/2002 | Gross et al. ................ 379/88.22 |
| 2005/0018829 | A1 | * | 1/2005 | Baker ....................... 379/207.02 |
| 2006/0062205 | A1 | * | 3/2006 | Doherty et al. ............... 370/352 |

* cited by examiner

*Primary Examiner* — Vivian Chin
*Assistant Examiner* — Paul Kim
(74) *Attorney, Agent, or Firm* — Fay Kaplun & Marcin, LLP

(57) ABSTRACT

Described is a system and method for receiving information for a phone call corresponding to a subscriber, wherein the subscriber is subscribed to at least two services. The information is compared to subscriber information stored in a plurality of subscriber profiles, wherein each profile corresponds to one of the services. The phone call is then handled, when the information matches the subscriber information in one of the profiles, using the service corresponding to the profile.

20 Claims, 4 Drawing Sheets

SYSTEM AND METHOD FOR IDENTIFYING AND TREATING CALLS

BACKGROUND OF THE INVENTION

A telephone subscriber may subscribe to more than one service provided by a telephone service provider, where that service provider may provide the requisite telephone service over any network capable of supporting telephony. However, the subscriber may not desire to have multiple phone lines (e.g., different phone numbers) to support these services. For example, the user may subscribe to a business service and a personal service on the same phone line. Each of the services may employ different features to an incoming/outgoing call. That is, the user may desire to handle calls transmitted and/or received on the phone line in a different manner. However, call handling presently requires the user to perform a process of identifying which service is being used and notifying a call treatment service as to how to treat each incoming/outgoing call. Thus, there is a need for a system wherein the type of call may be automatically identified and treated accordingly on a per-call basis.

SUMMARY OF THE INVENTION

A method for receiving information for a phone call corresponding to a subscriber, wherein the subscriber is subscribed to at least two services. The information is compared to subscriber information stored in a plurality of subscriber profiles, wherein each profile corresponds to one of the services. The phone call is then handled, when the information matches the subscriber information in one of the profiles, using the service corresponding to the profile.

A system having a profile module storing a plurality of subscriber profiles, each subscriber profile including subscriber information and corresponding to a service and a call identifying module receiving information for a phone call, comparing the information to the subscriber information in the plurality of subscriber profiles stored in the profile module and identifying one of the subscriber profiles by matching the information to the subscriber information in the one of the subscriber profiles. The system further includes a plurality of call handling modules, each call handling module corresponding to at least one of the subscriber profiles and implementing the service corresponding to the at least one subscriber profile, wherein the phone call is handled by one of the call handling modules corresponding to the identified one of the subscriber profiles.

A system having a server device storing a plurality of subscriber profiles, each subscriber profile including subscriber information and corresponding to a service and a phone device receiving a phone call, wherein information for the phone call is communicated to the server to compare the information to the subscriber information in the plurality of subscriber profiles and identifying one of the subscriber profiles by matching the information to the subscriber information in the one of the subscriber profiles, wherein the phone call is handled using the service corresponding to the identified one of the subscriber profiles.

DETAILED DESCRIPTION

Figure 1:
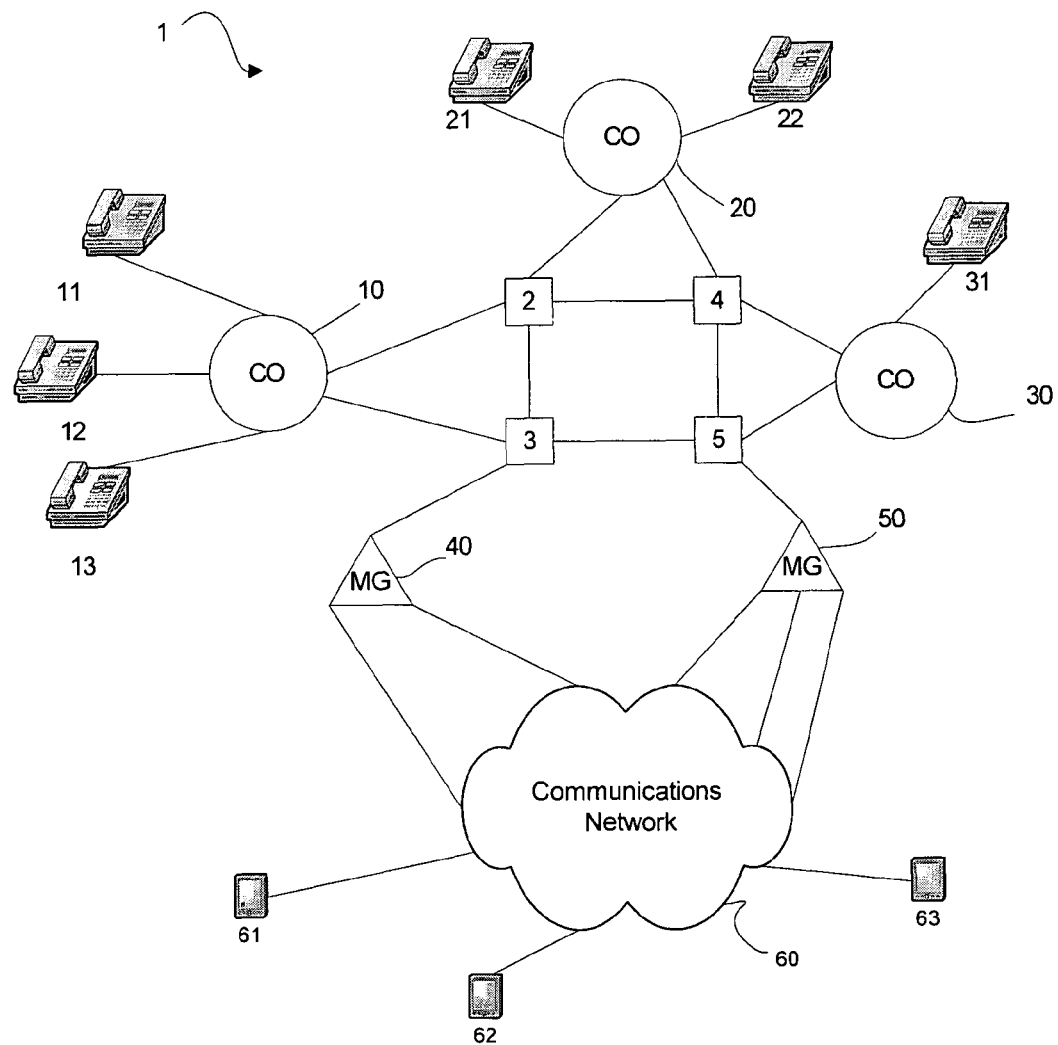
FIG. 1 is an exemplary embodiment of a network arrangement on which the present invention may be implemented.

The present invention may be further understood with reference to the following description and the appended drawings, wherein like elements are referred to with the same reference numerals. The present invention addresses shortcomings in the field of handling a call based on a call type. More specifically, the exemplary embodiments of the present invention provide for a system that may handle calls without the need for human intervention to identify the type of call or to specify a protocol.

FIG. 1 shows an exemplary network arrangement 1 for the connection of voice communications. The network arrangement 1 is provided to illustrate an exemplary network for providing voice communications for network subscribers on which the present invention may be implemented. However, those of skill in the art will understand that the present invention may be implemented on any telecommunications network capable of supporting voice communications. For example, in one embodiment the network may be a circuit-switched network, such as a PSTN or an integrated switched digital network ("ISDN"). In another embodiment, the network may be a packet-based network, such as the Internet or an Intranet. In an even further embodiment, the network may be some combination of a circuit-switched network and packet-based network. Finally, while the exemplary network arrangement shows a wired communications network, the invention is not limited to a wired infrastructure. The exemplary embodiments may be easily implemented in a wireless network infrastructure whether that network is representative of a standard voice network or a Broadband network.

The network arrangement 1 includes three central offices ("CO") 10-30, which are locations where telephone companies terminate customer lines and locate switching equipment to interconnect those lines with other networks. In this example, the customer lines 11-13 terminate at the CO 10, the customer lines 21-22 terminate at the CO 20 and the customer line 31 terminates at the CO 30. The customer lines may be any type of lines, for example, plain old telephone service ("POTS") lines, integrated services digital network ("ISDN") lines, frame relay ("FR") lines, etc.

Between the COs 10-30, there may be a series of switching stations 2-5. These switching stations 2-5 direct the calls along a route from a transmitting CO to a receiving CO. For example, a user on the customer line 11 may attempt to call a user at the customer line 31. The call will be transmitted from the customer line 11 to the CO 10, which will then route the call into the system to arrive at the CO 30. When the call is in the system, it may take a variety of routes between the CO 10 and the CO 30 based on various parameters, e.g., system traffic, shortest route, unavailable switches, etc. In this example, the call may be routed from the CO 10 to the switching station 2, through to the switching station 4 and then to the CO 30 which connects the call to the customer line 31. The portion of the network arrangement 1 described above may be considered the public switched telephone network ("PSTN") portion of exemplary network arrangement 1.

In addition, there may be a Voice over Internet Protocol ("VoIP") portion of network arrangement 1. In this example, VoIP lines 61-63 allow users to transmit and receive voice signals via a communications network 60 (e.g., the Internet).

The VoIP lines 61-63 may be connected to VoIP telephones of various forms, for example, personal computers, mobile devices (e.g., a cellular telephone, a laptop computer, a network interface card, a handheld computer, a personal digital assistant ("PDA"), etc.), fax machines, simple telephones, etc. If a VoIP line subscriber makes a voice call to another VoIP line subscriber (e.g., user of VoIP line 61 calls user of VoIP line 62), the call may be routed through the Internet 60. However, media gateways ("MG") 40-50 may act to translate and route calls from the PSTN portion of the network arrangement 1 to the VoIP portion or equivalently from the VoIP portion of the network to the PSTN portion. Thus, if the subscriber of VoIP line 61 calls the subscriber of customer line 31, the call may be routed from the VoIP line 61 through the Internet 60 to the MG 50 and through to the CO 30 which connects the call to the customer line 31. Similarly, if the subscriber of customer line 31 calls the subscriber of VoIP line 61, the call will be routed from the PSTN portion of the network 1 to the VoIP portion via one of the MGs 40 and 50.

Figure 2:
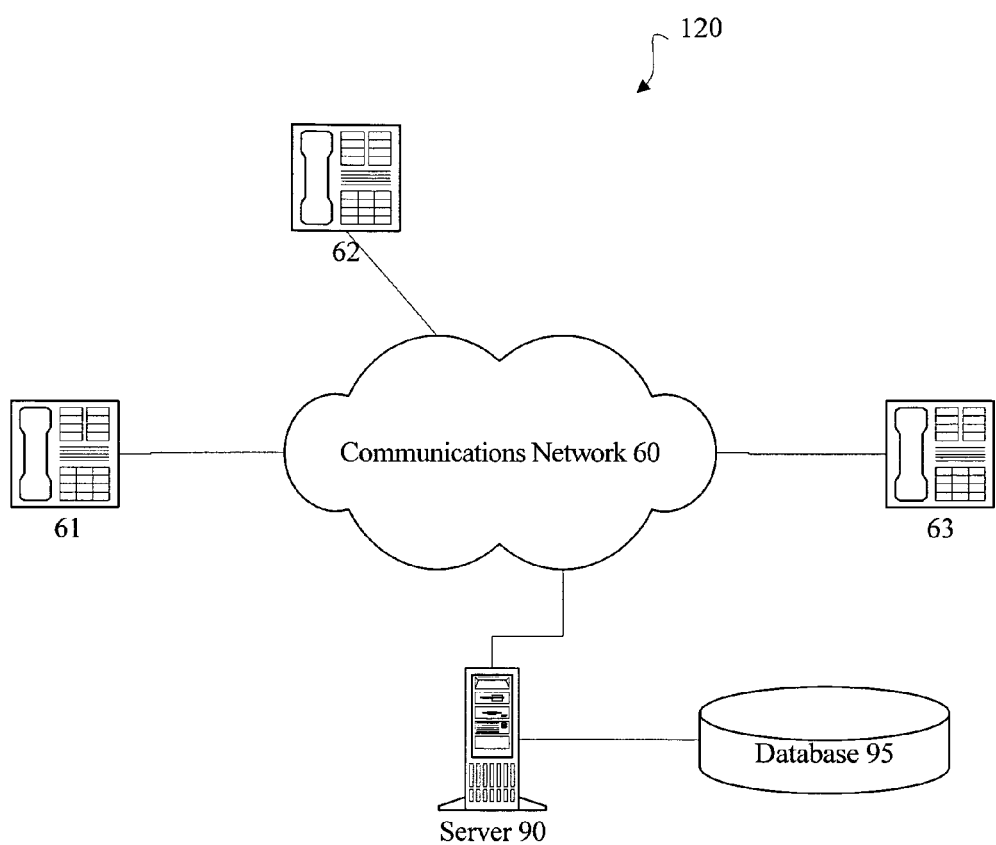
FIG. 2 is an exemplary embodiment of a VoIP portion of a network arrangement on which the present invention may be implemented.

FIG. 2 shows the exemplary VoIP portion 120 of the network arrangement 1 illustrated in FIG. 1. The exemplary embodiments of the present invention will be described with reference to the VoIP portion 120 of the network arrangement. However, those of skill in the art will understand that the call handling service described herein may be implemented in other portions of the network arrangement. For example, the functionality described below for the call handling service may be implemented at the COs 10, 20, 30 or in other network locations.

The VoIP portion 120 includes the same components as shown in FIG. 1, i.e., VoIP phone devices 61-63 and communication network 60. The VoIP portion 120 is also shown as including a server 90 having a database 95 coupled to the communication network 60. The exemplary embodiment of the present invention will be described with reference to a call handling service being implemented via the server 90. However, the call handling service may be implemented in any hardware or software connected to the network. For example, a fully functional VoIP phone device may include enough memory and processing power to implement the functionality described herein for the call handling service or for various portions of the call handling service. In addition, the functionality described for the call handling service may be distributed to multiple hardware and software components.

A telephone line subscriber (e.g., phone line 61 subscriber) may subscribe to any number of services provided by the network provider. These different services may provide different features for the subscriber, including the handling of incoming and outgoing calls to or from a specified phone number or termination point. For example, one type of service may be configured to reject calls at a particular time of day. A different type of service may be configured to forward calls to a different number or system (e.g., to the subscriber's mobile phone, to the subscriber's voice mail system, etc.). Those of skill in the art will understand that the number of services (or types of call handing) are unlimited and specific services may be tailored for use by all subscribers, a particular set of subscribers or individual subscribers. However, in present systems a subscriber's treatment of an outgoing call is based upon the calling (i.e., the subscriber's) telephone number (i.e., the ANI or some equivalent identifier like a source IP Address) and not upon the called number (i.e., the DNIS or some equivalent, like a destination IP address) in combination with the calling number. As such all calls originating from a particular telephone number are treated in the same manner.

However, according to an exemplary embodiment of the present invention, calls placed and received through the communications network 60 may be identified by a call handling service that automatically determines the call type and selects the correct subscribed service to be applied to the call. Thus, when a telephone service subscriber places or receives a call, the call handling service automatically determines the call type and the correct service(s) is applied without any interaction by the subscriber. The call handling service allows a subscriber to subscribe to multiple services without requiring the subscriber to manually identify call types for handling purposes. In addition, the call handling service allows network providers to provide additional services or service classes to its subscribers without placing an additional burden on the subscribers.

Figure 3:
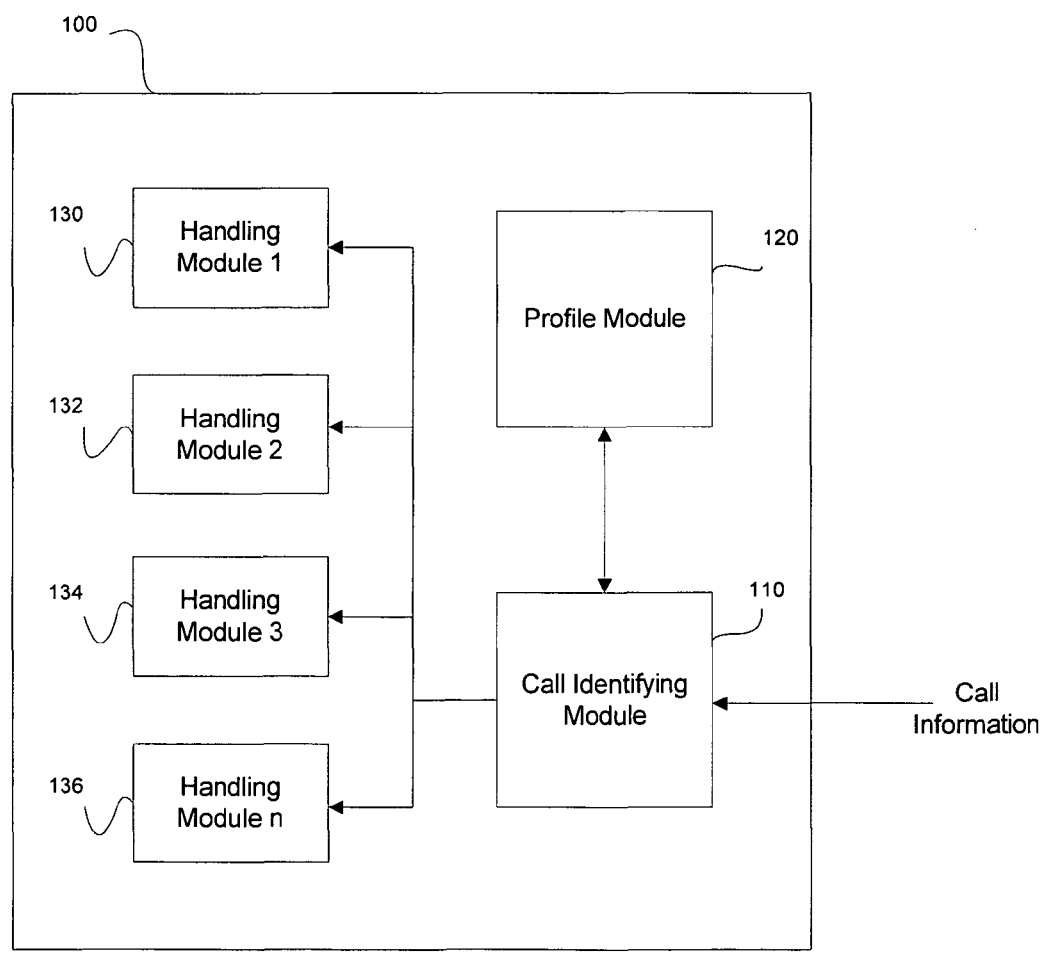
FIG. 3 shows a block diagram of an exemplary call handling service according to the present invention.

FIG. 3 shows a block diagram of an exemplary call handling service 100 including a call identifying module 110, a profile module 120 and a plurality of handling modules 130-136. The functionality associated with each of these modules will be described in detail below. This functionality may be implemented via hardware, software or a combination thereof. For example, the profile module 120 may store a set of profiles (described below). The profile module 120 may be implemented as entries in a database 95 of server 90. The possible hardware and/or software implementations of each of the modules will be apparent to those of skill in the art.

Initially, the profile module 120 is used to store subscriber profiles. Each profile includes a defined set of services that are to be applied to calls (outgoing/incoming) that are associated with the profile. The profiles may include any type or number of services that are defined by the telephone service subscriber or the network provider. In one example, the network provider may provide a suite of call services designed for business calls, personal calls, etc. A subscriber may subscribe to more than one of these defined suites and a profile may be created for each of the subscribed suite of services. In another example, the network provider may provide multiple call services that are individually selectable by the subscriber. The subscriber may then select the desired services and define their own profiles based on the selected services and intended use. For example, the subscriber may select a first group of services for handling their personal calls and designate a "personal" profile and a second group of services for handling business calls and designate a "business" profile. Again, those of skill in the art will understand that the number of profiles that may be defined is only limited by the number of call services (and combinations thereof) offered by the network provider. Thus, each profile stored in the profile module 120 is associated with a specific service or set of services that the subscriber desires to be applied to the calls defined in the profile. In addition, each profile may include the subscriber's phone numbers to which the profile should be applied. For example, the subscriber may have a series of phones including, standard phones, VoIP phones, mobile phones, etc. One or more profiles may be applicable to these phones. Thus, each profile may store the phone numbers of the phones to which the profile is to be applied.

Each profile may include further information (e.g., a reference to particular callers or phone numbers) that are associated with the profile. There are a number of manners in which the information may be populated into the profile. For example, when the user subscribes to a particular service, the user may provide a list of phone numbers that should be associated with each profile. This providing of phone numbers may be, for example, via manual input using a form on a web site. In another example, the subscriber may provide the network provider with a contact list (or address book) that includes the associated profile for each person/entity/number in the contact list. In a further example, the VoIP phone device 61 may store numbers from previous incoming/outgoing calls and these numbers may be sent to the profile module 120 to be stored in the corresponding profile. In another example, as incoming calls are received or outgoing calls are dialed, the information for the call may be sent to the profile module 120 to be stored in the corresponding profile. In addition, the profile module 120 may send a prompt to the subscriber when the profile module 120 receives a new information to have the subscriber associate a profile with the number. In a final example, the information is shown to be not necessarily limited to specific information for an individual call (e.g., specific numbers, caller names, etc.), but may rely on general characteristics of calls and/or rules to define the profile with which a call is associated. For example, all calls to or from a specific area code may be considered to be associated with a profile or all international calls may be considered to be a associated with a profile, etc. In such a case, the profile may not include a listing of specific numbers, but may include a rule, e.g., calls starting with area code '###' are associated with profile X. Those of skill in the art will understand that there may be other manners of populating the numbers into the profiles.

The subscriber profiles may be continuously updated, e.g., when a new number associated with an incoming/outgoing call is added to a profile, when the subscriber subscribes to a new service or changes an existing service for the profile, when the subscriber defines a new profile or subscribes to a new provider defined profile, etc. Because the profile may be changed often, the network provider may include a user interface such as a graphical user interface ("GUI") to allow the user to change/update/add profiles. For example, in the VoIP portion 120, the server 90 may host a web page with the GUI allowing the subscriber to interact with their profiles.

The call identifying module 110 is used to identify the subscriber profile associated with each incoming and/or outgoing call to/from the telephone device (e.g., VoIP telephone 61). The call identifying module 110 performs this function by accessing the subscriber profiles in the profile module 120 and determining whether the incoming/outgoing number (or other identifying information) has been associated with a particular profile. Based on the identified profile, the call identifying module 110 will then direct the call to the appropriate handling module 130-136. The handling modules 130-136 may each be associated with a particular profile, i.e., each handling module implements the services associated with the profile. The information for the association of the handling module with profile may also be stored in the profile.

For example, the subscriber may have subscribed to a first suite of services that are designed to handle business calls and a second suite of services designed to handle personal calls. The business services may be implemented by handling module 130 and the personal services may be implemented by the handling module 132. When the user makes a phone call, the call identifying module 110 may access the profiles for the subscriber and determine whether the called number is associated with the business profile or the personal profile, e.g., by comparing the called number to numbers stored in the two subscriber profiles in the profile module 120. If it is determined, for example, that the called number is associated with the business profile, the call identifying module 110 will send the call to the handling module 130 so that the subscribed business services may be executed for the call.

Those of skill in the art will understand that when it is described that the call identifying module 110 directs the call to one of the handling modules 130-136, this is not necessarily referring to a physical redirection of the call signal to a processing module. Rather, it may be referring to the call identifying module 110 invoking a particular set of call handling rules that implement the services in the identified profile. While the input to the call identifying module 110 may be the actual physical call signal, it may also be just information extracted from the signal (e.g., outgoing number information). Thus, when the call identifying module 110 is described as directing a call to a handling module 130-136, it may be sending a message to, for example, software code to apply a defined set of rules (corresponding to the selected services) to handle the call.

Figure 4:
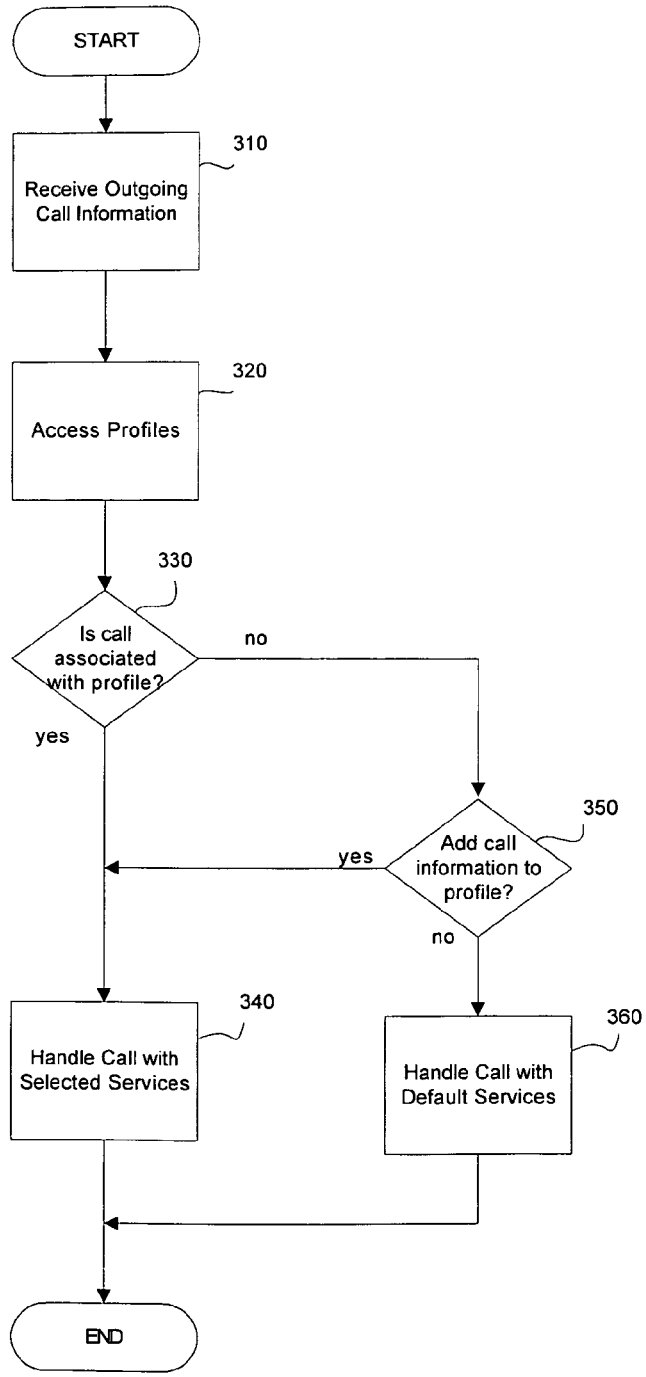
FIG. 4 is an exemplary embodiment of a call handling method according to the present invention.

FIG. 4 shows an exemplary method 300 for handling calls according to the present invention. The method 300 will be described with reference to an outgoing phone call that is made by the subscriber. In step 310, a telephone service subscriber (e.g., a user of VoIP telephone device 61) dials an outgoing call. Information about the outgoing call is received by the call identifying module 110. The information may be, for example, the dialed number (e.g., directly from the VoIP phone device 61 or from a dialed number identification service ("DNIS")).

The present example will be described with reference to the call information being a phone number. However, other information may also be used. For example, in VoIP networks (or hybrid networks which include a VoIP portion) the device which is being called may register with the network or be assigned a unique identifier by the network. In one example, a VoIP network may use the Session Initiated Protocol ("SIP") which is an application layer control protocol. In the SIP model, each device that may receive a phone call over the network may register with a central server (e.g., server 90 in FIG. 2). The registration information may include a unique identifier for the device (e.g., IP address, pseudo-number, etc.). This unique identifier information may be stored in one of the profiles in the profile module 120. Thus, the call identifying module 110 and profile module 120 may use other information beside the actual called number to identify the profile that should be used for the call.

Those of skill in the art will understand that the present invention may be used to identify and select the correct subscriber profile for any device that registers in some manner with the network or with a device on the network, i.e., a device which can be uniquely identified. For example, in some cases, the SIP registration may be based on a peer-to-peer ("P2P") model, where each individual device registers with a specific (or group) of end user devices rather than a central server. This registration would also be sufficient for implementing the exemplary embodiment of the present invention. In another example, in a mobile network, each phone may register with the network so that the network can direct phone calls to the mobile phone. Again, this registration is sufficient for implementing the exemplary embodiment of the present invention.

In step 320, the call identifying module 110 accesses the subscriber profiles in the profile module 120. Where the call identifying module 110 and the profile module 120 are implemented locally for the subscriber (e.g., on the VoIP phone device 61, on a server at the subscriber's premises, etc.), all the stored profiles may be for the particular subscriber. However, where the profile module 120 is implemented remotely for a plurality of subscribers on the network, the call identifying module 110 may need to select the correct profiles for the particular subscriber. Thus, the information provided to the call identifying module 110 may also include some manner of identifying the subscriber so that the correct profiles may be accessed.

In step 330, it is determined whether the outgoing call is associated with a stored profile. As described above, the call identifying module 110 will access the subscriber profiles in the profile module 120 and determine whether the information (e.g., phone number, IP address, pseudo-number, etc.) matches the information stored in one of the profiles. For example, if the profiles are stored in a database format, each phone number stored in the profiles may be searched to determine if the number for the current call matches any of these stored numbers. Those of skill in the art will understand that the database implementation is only exemplary and there may be other manners of matching call information to information stored in a profile. For example, the profile may be stored as a table, data array, etc. and the search (or matching) may be performed using well known methods.

If the current call is associated with a profile, the call identifying module 110 sends an indication to the appropriate handling module 130-136 (i.e., the handling module associated with the determined profile) and the call is handled using the services implemented by the handling module (step 340) Thus, the subscriber, without any interaction during the call, has the correct services automatically applied to the call.

If the current call is not associated with a particular profile as defined in the subscriber profile, the user may be prompted to determine if the call information should be added to one of the stored profiles (step 350). If the user elects to add the call information to a stored profile, the call identifying module 110 may use the newly saved information to direct the call to the correct handling module 130-136 (step 340). If the user elects not to save the information to the profile, a default handling module may be used to handle the call (step 360). In an alternative embodiment, if the user elects not to add the call information to a currently stored profile, the user may be prompted to determine if they want to create a new profile for the call information. This prompting may be performed while the call is taking place or at a later time.

It should be noted that in the above exemplary embodiment, the subscriber was assumed to have one phone line (e.g. connected to VoIP phone device 61). However, a subscriber may have multiple phone lines and the subscriber profile may be applied to each of these phone lines, i.e., the call handling service may be implemented for all incoming/outgoing calls on all the subscriber's phone lines. In addition, it may also be possible to set up different profiles for different phone lines.

As described above, each of the phone devices may register with the network. Thus, each of the devices that belong to the subscriber may be registered with the network. The subscriber may desire that the subscriber profile be applied to each of the phone devices, e.g., all subscriber phone devices have business and personal call treatment applied to them. Thus, each of the subscriber profiles may also include a listing of the devices to which the profile should be applied, i.e., the call identifying module may first search for the identifier (e.g., phone number, SIP registration, etc.) of the subscriber's device to select all the profiles associated with the subscriber and then search the profiles for the called number to apply the correct treatment to the call.

The present invention has been described with reference to specific exemplary embodiments. Those skilled in the art will understand that changes may be made in the details of the invention, without departing from the teaching of the invention. Accordingly, various modifications and changes may be made to the embodiments without departing from the broadest scope of the invention as set forth in the claims that follow. The specifications and drawing are, therefore, to be regarded in an illustrative rather than a restrictive sense.

What is claimed is:

1. A device, comprising:
   a processor; and
   a memory including a set of instructions executable by the processor, the set of instructions configured to:
   receive information for a phone call corresponding to a subscriber, wherein the subscriber is subscribed to at least two services;
   compare the information to subscriber information stored in a plurality of subscriber profiles, wherein each profile corresponds to one of the services and wherein the subscriber information is automatically populated based on previous incoming and outgoing phone calls;
   automatically identify at least one subscribed profile associated with the phone call without user interaction; and
   automatically handle the phone call, when the information matches the subscriber information in the at least one identified subscribed profiles, using the service corresponding to the profile.

2. The device of claim 1, wherein the phone call is an outgoing call from the subscriber.

3. The device of claim 1, wherein the information is one of a phone number corresponding to the phone call, an IP address corresponding to the phone call, a registration number corresponding to the phone call and a pseudo-number corresponding to the phone call.

4. The device of claim 1, wherein the at least two services are call handling services.

5. The device of claim 1, wherein the subscriber profiles are defined by one of the subscriber and a network provider.

6. The device of claim 1, wherein the set of instructions are further configured to:
   receive the subscriber information; and
   store the subscriber information in a corresponding one of the subscriber profiles.

7. The device of claim 6, wherein the subscriber information is received in the form of one of a contact list and an address book.

8. The device of claim 1, wherein the subscriber information includes a rule.

9. A system, comprising:
   a profile memory module storing a plurality of subscriber profiles, each subscriber profile including subscriber information and corresponding to a service, wherein the subscriber information is automatically populated based on previous incoming and outgoing phone calls;
   a call identifying processor module receiving information for a phone call, comparing the information to the subscriber information in the plurality of subscriber profiles stored in the profile module and automatically identifying one of the subscriber profiles without user interaction by matching the information to the subscriber information in the one of the subscriber profiles; and
   a plurality of call handling server modules, each call handling server module corresponding to at least one of the subscriber profiles and implementing the service corresponding to the at least one subscriber profile, wherein the phone call is automatically handled by one of the call handling server modules corresponding to the identified one of the subscriber profiles.

10. The system of claim 9, wherein the phone call is an outgoing call from the subscriber.

11. The system of claim 9, wherein the information is one of a phone number corresponding to the phone call, an IP address corresponding to the phone call, a registration number corresponding to the phone call and a pseudo-number corresponding to the phone call.

12. The system of claim 9, wherein the service is a call handling service.

13. The system of claim 9, wherein the subscriber profiles are defined by one of the subscriber and a network provider.

14. The system of claim 9, wherein the system is implemented in one of a circuit switched portion and a packet switched portion of a voice communications network.

15. The system of claim 14, wherein the packet switched portion includes a VoIP portion.

16. The system of claim 9, wherein the system is implemented on a subscriber phone device.

17. The system of claim 9, wherein at least one of the profiles is deactivated and the call identifying processor module does not perform the comparing for the deactivated profile.

18. The system of claim 9, wherein the profile memory module includes an interface for a subscriber to update the subscriber profiles.

19. A system, comprising:
a server device storing a plurality of subscriber profiles, each subscriber profile including subscriber information and corresponding to a service, wherein the subscriber information is automatically populated based on previous incoming and outgoing phone calls; and
a phone device receiving a phone call, wherein information for the phone call is communicated to the server to compare the information to the subscriber information in the plurality of subscriber profiles and automatically identifying one of the subscriber profiles without user interaction by matching the information to the subscriber information in the one of the subscriber profiles, wherein the phone call is automatically handled using the service corresponding to the identified one of the subscriber profiles.

20. The system of claim 19, wherein the phone device is a VoIP phone device.

* * * * *